(12) United States Patent
Burton et al.

(10) Patent No.: US 6,748,486 B2
(45) Date of Patent: Jun. 8, 2004

(54) METHOD, SYSTEM, AND DATA STRUCTURES FOR SUPERIMPOSING DATA RECORDS IN A FIRST DATA FORMAT TO MEMORY IN A SECOND DATA FORMAT

(75) Inventors: David Alan Burton, Vail, AZ (US); Robert Louis Morton, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 09/754,772

(22) Filed: Jan. 4, 2001

(65) Prior Publication Data

US 2002/0087786 A1 Jul. 4, 2002

(51) Int. Cl.[7] ............................................... G06F 12/00
(52) U.S. Cl. .................... 711/112; 711/170; 711/100
(58) Field of Search ................. 711/112, 170, 711/111, 100

(56) References Cited

U.S. PATENT DOCUMENTS

| | | |
|---|---|---|
| 5,146,576 A | 9/1992 | Beardsley et al. |
| 5,235,690 A | 8/1993 | Beardsley et al. |
| 5,235,692 A | 8/1993 | Ayres et al. |
| 5,394,532 A | 2/1995 | Belsan |
| 5,535,372 A | 7/1996 | Benhase et al. |
| 5,588,140 A | 12/1996 | Misukanis et al. |
| 5,592,618 A | 1/1997 | Micka et al. |
| 5,664,144 A | 9/1997 | Yanai et al. |
| 5,819,054 A | 10/1998 | Ninomiya et al. |
| 5,862,363 A * | 1/1999 | Taroda .................. 395/500 |
| 6,041,386 A | 3/2000 | Bello |
| 6,052,797 A | 4/2000 | Ofek et al. |
| 6,418,509 B1 * | 7/2002 | Yanai .................... 711/112 |
| 6,438,646 B1 * | 8/2002 | Kitamura ............... 711/112 |

* cited by examiner

Primary Examiner—Kimberly McLean-Mayo
(74) Attorney, Agent, or Firm—David W. Victor; Konrad Raynes & Victor LLP (57) ABSTRACT

Provided is a method, system, and program for superimposing a data record in a first data format onto a storage space in a second data format. A plurality of control blocks are built in memory indicating operations to perform to transfer components of the data record in the first data format to locations in memory in the second data format. A data transfer device is signaled to access the control blocks built in the memory. The data transfer device accesses the control blocks in the memory and then transfers components of the data record in the first data format to the memory to be stored in the second data format according to the operations indicated in the control blocks.

31 Claims, 8 Drawing Sheets

| HCB No. | Memory Location 60 | Direction 62 | Linkage 64 | Sector Mode 66 | Generate LRC 68 | IRQ Enable 70 | XOR Last 72 | Length (Bytes) 74 | Target Address 76 | Source Address 78 | LRC Partial Result 80 |
|---|---|---|---|---|---|---|---|---|---|---|---|
| HCB 1 | μP | Write | First | Virtual | Yes | No | n/a | Record Header Length | cache | μP | 0 |
| HCB 2 | Memory | Read | Middle | Real | No | No | No | 2 | cache | n/a | n/a |
| HCB 3 | Memory | Write | Middle | Virtual | No | No | Yes | 2 | cache | n/a | n/a |
| HCB 4 | Memory | Read | Middle | Real | No | No | No | Key Length | cache | n/a | n/a |
| HCB 5 | Memory | Write | Middle | Virtual | Yes | No | Yes | Key Length | cache | n/a | 0 |
| HCB 6 | Memory | Read | Middle | Real | No | No | No | 0-3 | cache | n/a | n/a |
| HCB 7 | Memory | Write | Middle | Virtual | No | No | Yes | 0-3 | cache | n/a | n/a |
| HCB 8 | Memory | Read | Middle | Real | No | No | No | 2 | cache | n/a | n/a |
| HCB 9 | Memory | Write | Middle | Virtual | No | No | Yes | 2 | cache | n/a | n/a |
| HCB 10 | Memory | Read | Middle | Real | No | No | No | Data Length | cache | n/a | n/a |
| HCB 11 | Memory | Write | Middle | Virtual | Yes | No | Yes | Data Length | cache | n/a | 0 |
| HCB 12 | Memory | Read | Middle | Real | No | No | No | 0-3 | cache | n/a | n/a |
| HCB 13 | Memory | Write | Middle | Virtual | No | No | Yes | 0-3 | cache | n/a | n/a |
| HCB 14 | Memory | Read | Middle | Real | No | No | No | 2 | cache | n/a | n/a |
| HCB 15 | Memory | Write | Middle | Virtual | No | No | Yes | 2 | cache | n/a | n/a |
| HCB 16 | Memory | Read | Middle | Real | No | No | No | 0-508 | cache | n/a | n/a |
| HCB 17 | Memory | Write | Last | Virtual | No | Yes | Yes | 0-508 | cache | n/a | n/a |

METHOD, SYSTEM, AND DATA STRUCTURES FOR SUPERIMPOSING DATA RECORDS IN A FIRST DATA FORMAT TO MEMORY IN A SECOND DATA FORMAT

BACKGROUND OF THE INVENTION

1. Field of the Invention

The present invention relates to a system, method, and program for superimposing data records in a first data format to memory in a second data format

2. Description of the Related Art

Data stored in a direct access storage device (DASD) may be arranged in a fixed block address (FBA) format or a count-key-data (CKD) format. The FBA format involves the storage of data in blocks of fixed size. These blocks are addressed by a block number relative to the beginning of the file. An FBA block is referred to as a sector, which is addressable by the host. The CKD format is a DASD data-recording format employing self-defining record formats in which each record is represented by a count area that identifies the record and specifies its format, an optional key area that may be used to identify the data area contents, and a data area that contains the user data for the record. The CKD format provides for variable format data records.

Figure 1:
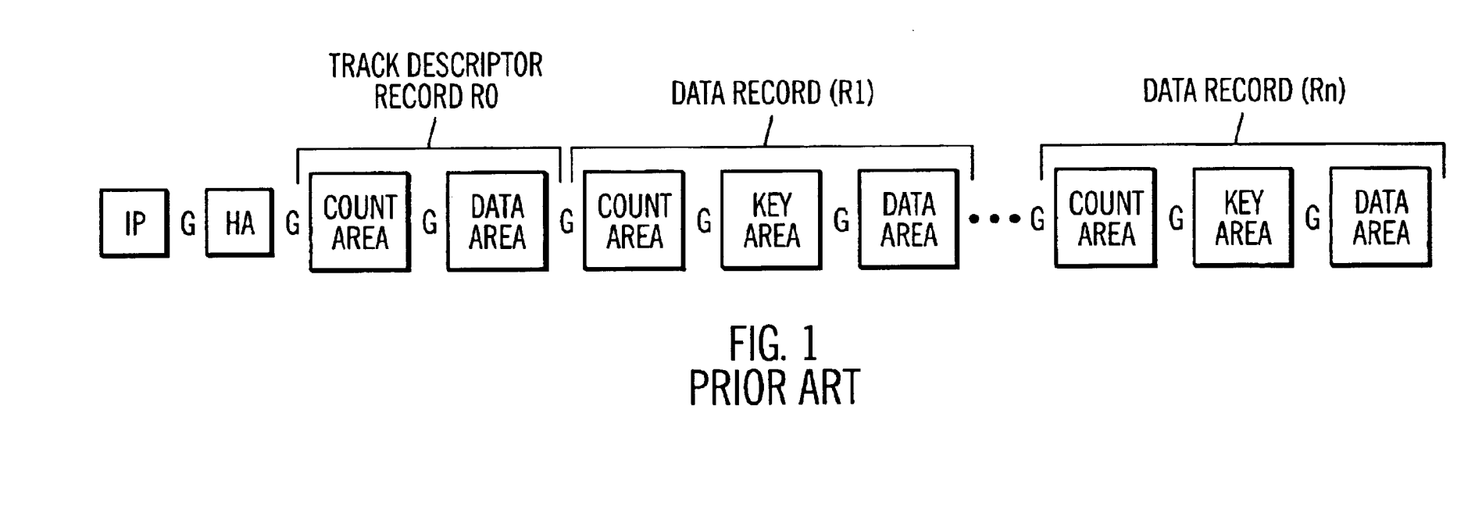
FIG. 1 illustrates an arrangement of a count-key-data (CKD) record in a manner known in the art.

FIG. 1 illustrates a prior art structure for a single CKD track in a CKD device. An index point (IP) is a starting point, followed by a gap (G), which indicates a break between the fields. A home address (HA) follows the first gap (G) and identifies the location of the track in the DASD and its operational status. Following the home address (HA) are the records, $R_0$ through $R_n$. Record zero ($R_0$) contains either system or user data. Each following record, $R_1$ through $R_n$, includes a count area that identifies the record and defines the lengths of the key and data areas. The key area of each record is optional and may be used by the programmer to identify the information in the data area record. The data area contains data. The number of records (R) that can be placed on a track depends on the length of the data areas of the records, whether the records contain a key area, and the size of the gaps. Records may be of equal or unequal lengths.

Host systems may need to write data in a CKD format to a DASD that stores data in FBA blocks because most storage devices, such as hard disk drives, use the FBA format to store data in fixed blocks. Host systems, such as the International Business Machines Corporation (IBM) Enterprise System Controller (ESCON) devices, continue to utilize the CKD format because CKD permits data records to be recorded as units of contiguous signals. Whereas, with FBA, data must be dissected and distributed into a group of fixed block-size sectors. Moreover, since the introduction of the IBM System/360 in 1964, nearly all IBM large and intermediate DASD devices employ the CKD data format. For these reasons, there is a need to store CKD records in FBA devices. In fact, the prior art provides techniques for emulating the CKD format on FBA devices and for converting CKD formatted records to the FBA format. Such CKD to FBA conversion techniques are taught in U.S. Pat. Nos. 5,535,372, 6,041,386, 5,535,372, and 5,664,144, which are all incorporated herein by reference in its entirety.

The transformation of a CKD record to FBA storage is typically implemented by the storage controller processor operating under the control of microcode. One disadvantage of using the primary storage controller processor to perform the CKD to FBA transformation is the significant burden placed on the storage controller processor. Dedicating storage processor cycles to CKD to FBA conversions can affect performance with respect to other Input/Output (I/O) operations handled by the storage controller processor. To address this problem, many high end storage controller systems, such as the IBM Enterprise Storage System (ESS), include a separate dedicated Application Specific Integrated Circuit (ASIC) to transform CKD records to a FBA format for storage in a FBA DASD. However, solutions that add a special-purpose ASIC to handle the CKD to FBA conversions increases the cost of the system.

For these reasons, there is a need in the art to provide alternative techniques for superimposing a CKD record onto FBA blocks of a DASD.

SUMMARY OF THE PREFERRED EMBODIMENTS

Provided is a method, system, and program for superimposing a data record in a first data format onto a storage space in a second data format. A plurality of control blocks are built in memory indicating operations to perform to transfer components of the data record in the first data format to locations in memory in the second data format. A data transfer device is signaled to access the control blocks built in the memory. The data transfer device accesses the control blocks in the memory and then transfers components of the data record in the first data format to the memory to be stored in the second data format according to the operations indicated in the control blocks.

In further embodiments, the control blocks further instruct the data transfer device to generate an error checking code from the data record and write the error checking code into the memory to store with the data record in the second data format.

Still further, a processor may build the control blocks in memory and signal the data transfer device with the pointer to the first control block in the memory.

Yet further, the first data format may comprise a count-key-data (CKD) data format and the second data format may comprise a Fixed Block Address (FBA) format.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 2:
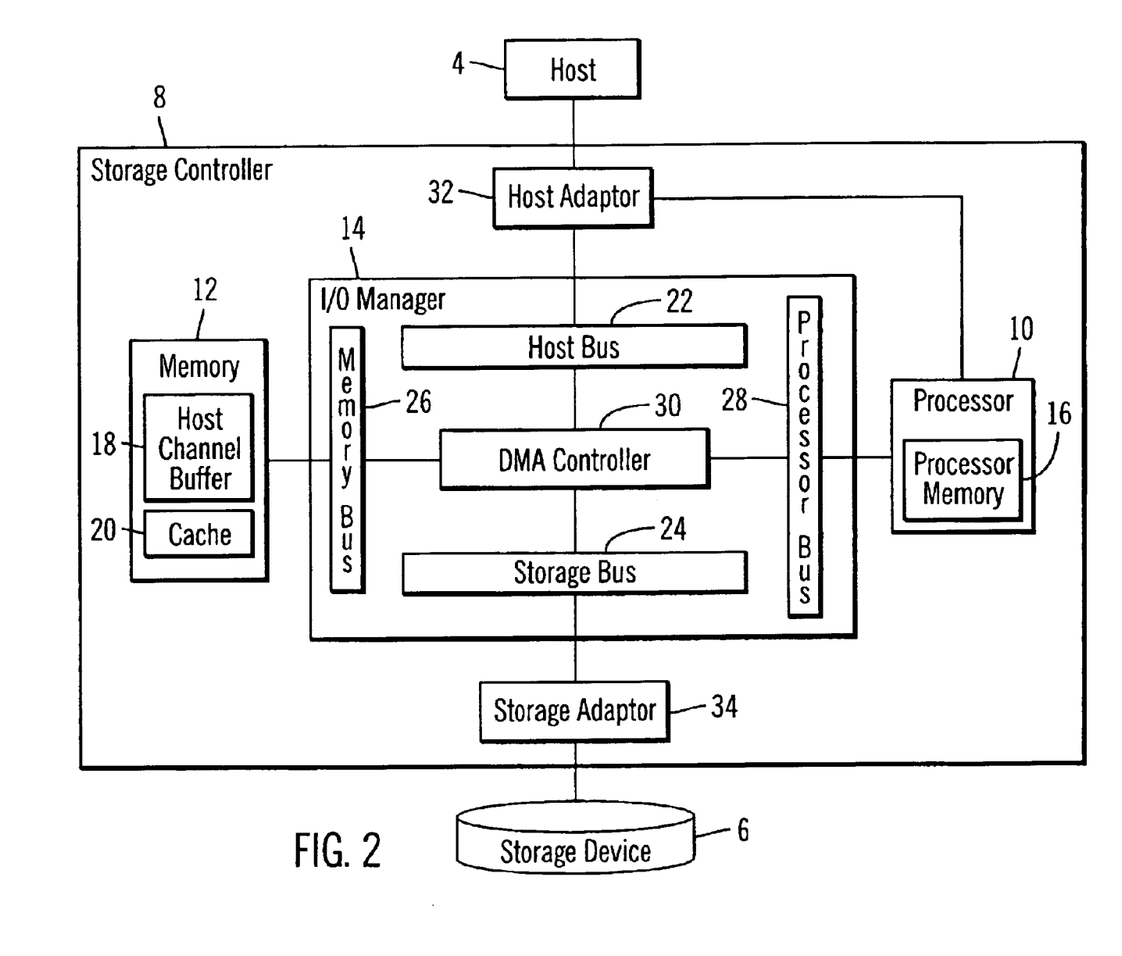
FIG. 2 is a block diagram illustrating a computing environment in which preferred embodiments are implemented.

FIG. 2 illustrates a computing environment in which preferred embodiments are implemented. A host 4 may comprise any computing device known in the art, including servers through which other client computers can access storage or clients. The host 4 includes at least one adaptor (not shown), such as a Fibre Channel or Small Computer System Interface (SCSI) adaptor card or any other network adaptor card known in the art. The host adaptors allow the host to communicate with a storage device 6 via a storage controller 8. The storage device 6 may comprise a DASD or any other non-volatile storage device and system known in the art, including hard disk drives, tape storage, optical disks, a Redundant Array of Independent Disks (RAID) array, etc. The storage controller 8 may comprise any control unit, storage controller, etc. that manages the transfer of data between an I/O device, such as storage device 6, and one or more hosts.

In preferred embodiments, the storage controller 8 includes a main processor 10, a memory 12, and an I/O manager 14. In preferred embodiments, the I/O manager 14 comprises one or more integrated circuit devices that manage the transfer of data between the storage device 6 and host 4. In preferred embodiments, data is transferred among the host 4, memory 12, and storage device 6 via the I/O manager 14 without requiring the processor 10 to be involved in the data movement operations. This arrangement relieves the main processor 10 from the otherwise substantially burdensome activity of directly controlling the transfer of data and performing conversions of CKD data records to FBA blocks, thereby improving overall storage controller 8 performance.

The processor 10 includes a processor memory 16, which may comprise an onboard cache or local memory device used by the processor 10. The processor memory 16 may be attached to the processor 10 via a local processor bus. The memory 12 may comprise one or more volatile, e.g., DRAMs, SRAMs, etc., or non-volatile memory device used to cache and buffer data. The memory 12 includes at least two different sections, a host channel buffer 18 to buffer CKD records received from the host 4 to write to the storage device 6 and a cache 20, which provides cache storage for the I/O operations managed by the storage controller 8.

The I/O manager 14 includes a host bus 22 for interfacing with host 4 systems; a storage bus 24 for interfacing with the storage device 6; a memory bus 26 for interfacing with the memory 12; a processor bus 28 for interfacing with the processor 10; and a Direct Memory Access (DMA) controller 30 to manage DMA channels providing direct communication from the cache 12 to the storage device 6 that entirely bypasses the main processor 10 of the storage controller 8. The busses 22, 24, 26, and 28 may comprise a Peripheral Component Interconnect (PCI) bus, Industry Standard Architecture (ISA) bus or any other communication interface device known in the art.

A host adaptor 32 provides for the data transfer protocol processing, such as SCSI or Fibre Channel protocol, to move data between the I/O manager 14 and host 4. A storage adaptor 32 provides for data transfer protocol processing between the I/O manager 14 and the storage device 6. The host 30 and storage 34 adaptors would each include a DMA controller to transfer data along DMA channels between the host 4 and cache 12 and cache 12 and storage 6 without involving the storage controller 8 main processor 10.

In preferred embodiments, the processor 10, cache 12, I/O manager 14, adaptors 32, 34, and DMA controller 30 are all on the same controller card or board. In alternative embodiments, any one or more of these components may be on separate cards all within the storage controller 8. Further, although multiple busses 22, 24, 26, and 28 are described in the implementation of FIG. 1, fewer busses may be used to provide communication between the DMA controller 30 and the host 4, processor 10, memory 12, and storage device 6.

Figure 3:
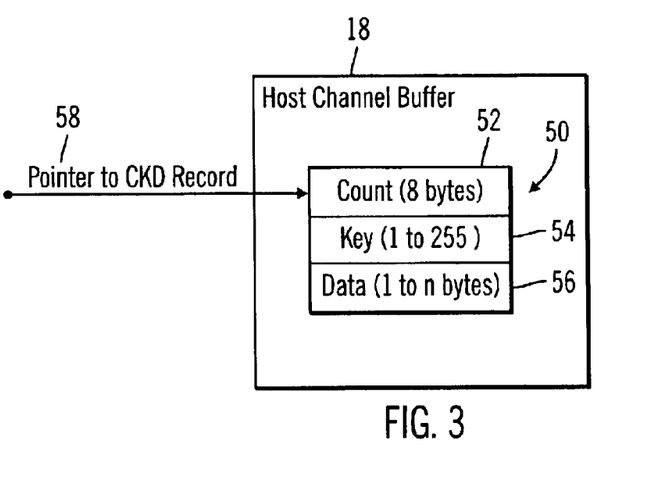
FIG. 3 illustrates how a CKD record received from a host channel is stored in memory in accordance with preferred embodiments of the present invention.

In preferred embodiments, the processor 10 builds hardware control blocks (HCBs) in the cache 20 to instruct the DMA controller 30 on how to convert a CKD record received from the host 4 into a format to store in the FBA blocks in cache 20. Once the CKD record is transferred to FBA blocks in the cache 20, the CKD record may be destaged to the storage device 6 to store in the FBA format. The host 4 transfers CKD records to the host adaptor 32, which then buffers the CKD record in the host channel buffer 18. FIG. 3 illustrates a CKD record 50 stored in the host channel buffer 18. A pointer 58 to the CKD record in the host channel buffer 18 is returned to the processor 10.

Figure 4:
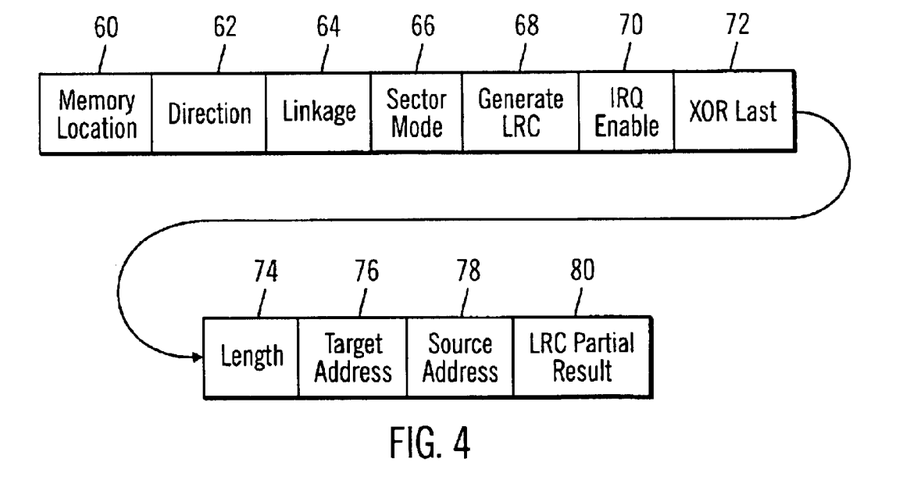
FIG. 4 illustrates fields in hardware control blocks (HCBs) to provide instructions on how to superimpose CKD records onto an FBA format in memory in accordance with preferred embodiments of the present invention.

As discussed, the DMA controller 30 processes hardware control blocks (HCBs) to transfer the CKD record 50 to 512 byte FBA blocks in cache 20. The processor 10 sets values in the hardware control blocks (HCBs) to instruct the DMA controller 30 on how to transfer the data from the host channel buffer 18 to the cache 20. In the described implementations, the processor 10 would set values in seventeen hardware control blocks (HCBs), each comprised of 64 bytes in cache. Each of the hardware control blocks (HCBs) instruct the DMA controller 30 to read data from the host channel buffer 18, XOR read data to generate a longitudinal redundancy check (LRC) check code, or write CKD or LRC data to the fixed block locations in cache 20. Each of the hardware control blocks (HCBs) include the fields shown in FIG. 4 and described below to inform and instruct the DMA controller 30:

Memory Location Field 60: includes a code indicating whether to perform the read/write operation with respect to a location in the memory 12, including a cache 20 address or host channel buffer 18 address, or a location in the processor memory 16. For instance, the code 0001 may indicate that the memory 12 is the target of the read/write operation and the code 0101 may indicate that the processor memory 16 is the target.

Direction Field 62: includes a code indicating whether the operation is a read or write operation to the target location. For instance, a value of "0" in this field may indicate a write operation and a value of "1" may indicate a read.

Linkage Field 64: In described implementations, the hardware control blocks (HCBs) are organized in a list, where each HCB, except the last HCB, includes a flag indicating whether the next HCB in cache 20 is to be included in the current DMA operation. The linkage field 64 includes a code indicating whether the HCB is a middle HCB (e.g., "01"), a last HCB (e.g., "01") or the first HCB (e.g., "10").

Sector Mode Field 66: includes a code indicating whether the address of the target location at which to perform the operation is a virtual address (e.g., "100") or a real FBA address (e.g., "000") directly corresponding to an address in memory 12. Addresses in the cache 20 are virtual addresses, where a cache manager provides a cache directory associating virtual cache addresses with physical blocks in the cache. In this way, the DMA controller may view contiguous virtual addresses that the cache manager maps to non-contiguous blocks in the cache 20. The addresses in the host channel buffer 18 are real addresses, meaning that the address of the target location corresponds directly to a fixed block in the buffer 18. Further, certain addresses in the cache 20 may comprise real addresses.

Generate LRC Field 68: includes code indicating whether to XOR data being written to generate an LRC check code.

IRQ Enable 70: includes code indicating whether to instruct the processor 10 that the DMA controller 30 has completed superimposing the CKD record 50 onto fixed block addresses in the cache 20.

XOR Last Field 72: In a DMA controller, when the XOR last mode is not enabled, then data is XORed without writing. XOR last mode indicates that the XOR operation on the data has completed and the DMA controller writes the XORed data. This field 72 includes a code indicating whether XOR last mode is enabled to instruct the DMA controller 30 to write the XORed data.

Length Field 74: includes a code indicating the number of bytes involved in the transfer.

Target Address Field 76: Indicates a target address of the read/write DMA controller 30 operation, which may comprise a microprocessor memory 16 or memory 12 address location.

Source Address Field 78: Indicates a source address of the read/write DMA controller 30 operation, which may comprise a microprocessor memory 16 or memory 12 address location.

LRC Partial Result Field 80: Includes the partial LRC check code as the XOR operations on the data being read is calculated.

Figure 5:
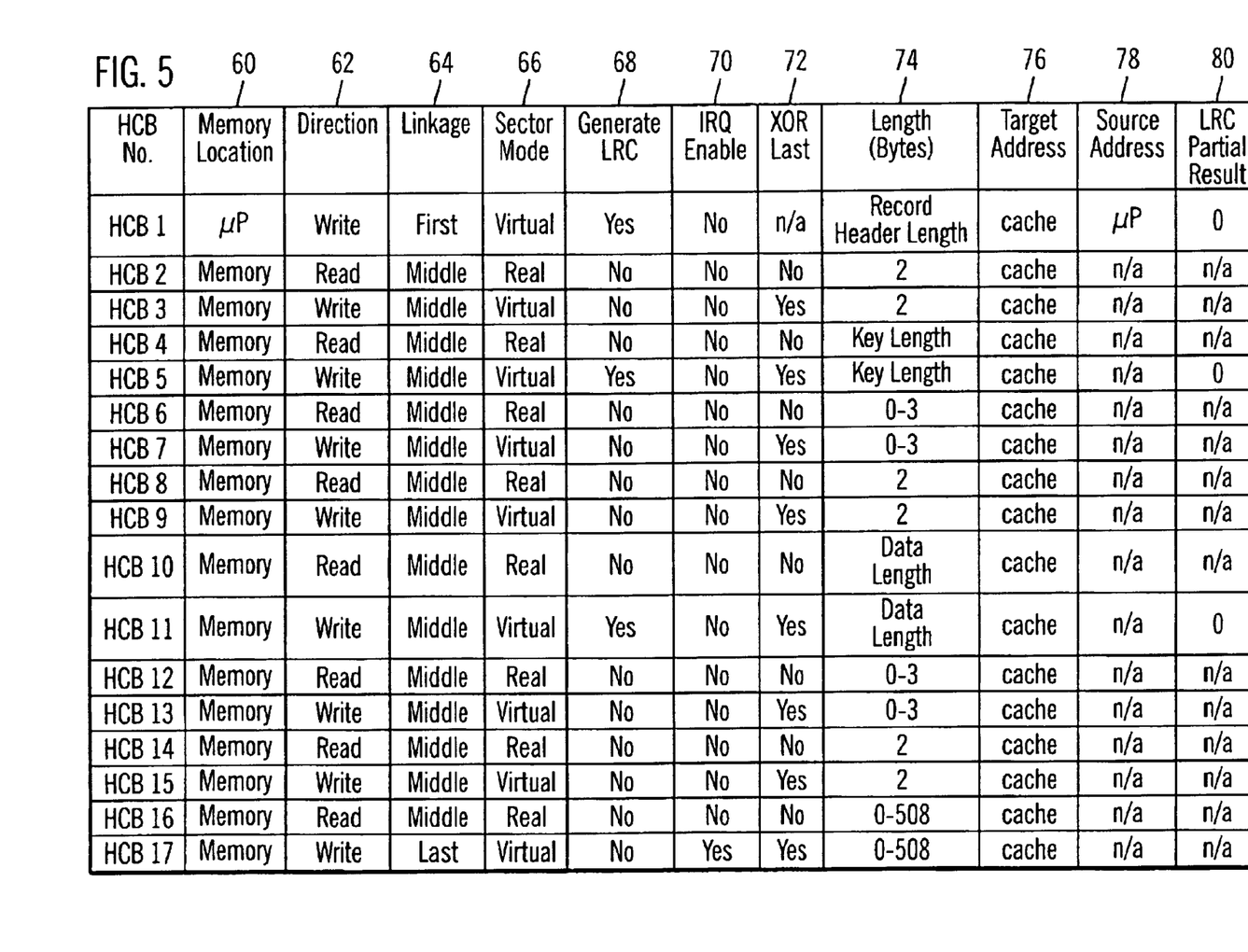
FIG. 5 is a table showing the values in the fields of seventeen hardware control blocks (HCBs) to provide the instructions in memory in accordance with an implementation of the preferred embodiments of the present invention.
Figure 6:
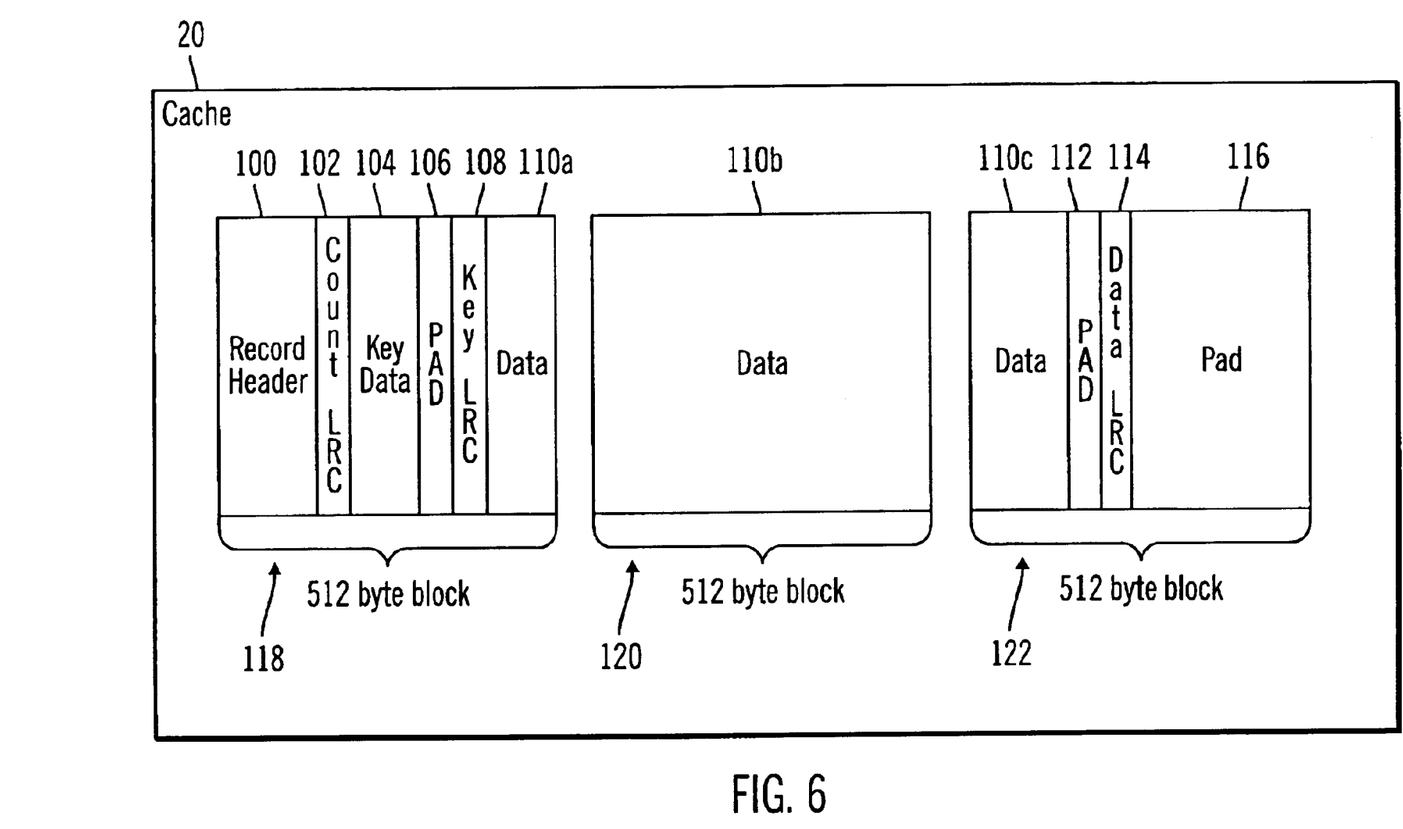
FIG. 6 provides an example of how a CKD record and various other data is stored in fixed blocks in cache in memory in accordance with preferred embodiments of the present invention.

FIG. 5 provides a table including possible values in a suggested implementation for the above described fields for each of the seventeen hardware control blocks (HCBs), HCB 1 to HCB 17, used by the DMA controller 30. FIG. 6 illustrates how the count 52, key 54, and data 56 fields in the CKD record 50 in the host channel buffer 18 are mapped to record header 100, key 104, and data 110a, b, c locations in 512 byte FBA blocks 118, 120, and 122 in the cache 20. The key 54 and data 56 fields may have zero or more bytes. In certain implementations, the processor 10 converts the count field 52 into a record header. The format of the record header 100 is specific to the controller and is known in the art. The processor 10 builds the record header 100 in the processor memory 16. The record header 100 is used by the storage controller 8 and may comprise a fixed number of bytes, such as 30 bytes. The DMA controller 30, in response to executing the hardware control blocks (HCBs), would insert a count LRC 102, key LRC 108, and data LRC 114 providing LRC check codes for the count 100, key 104, and data 110a, b, c portions, respectively, of the CKD record 50. In the example of FIG. 6, the data portion of the CKD record 50 is mapped to three data portions 110a, b, c, that span three 512 byte fixed blocks (sectors) 118, 120, and 122 in cache 20. The DMA controller 30 further inserts pads 106 and 112 between key data 104 and the key LRC 106, and the data 110c and the data LRC 114. The pads 106 and 112 ensure that the LRC codes 108 and 114 begin on the second half of a word, where a word comprises a four byte portion of the 512 byte sector. Further, pad 116 fills the remainder of the sector 122. In such implementations, each CKD record spans one or more CKD records, but no two different CKD records share the same 512 byte sector.

Figure 7:
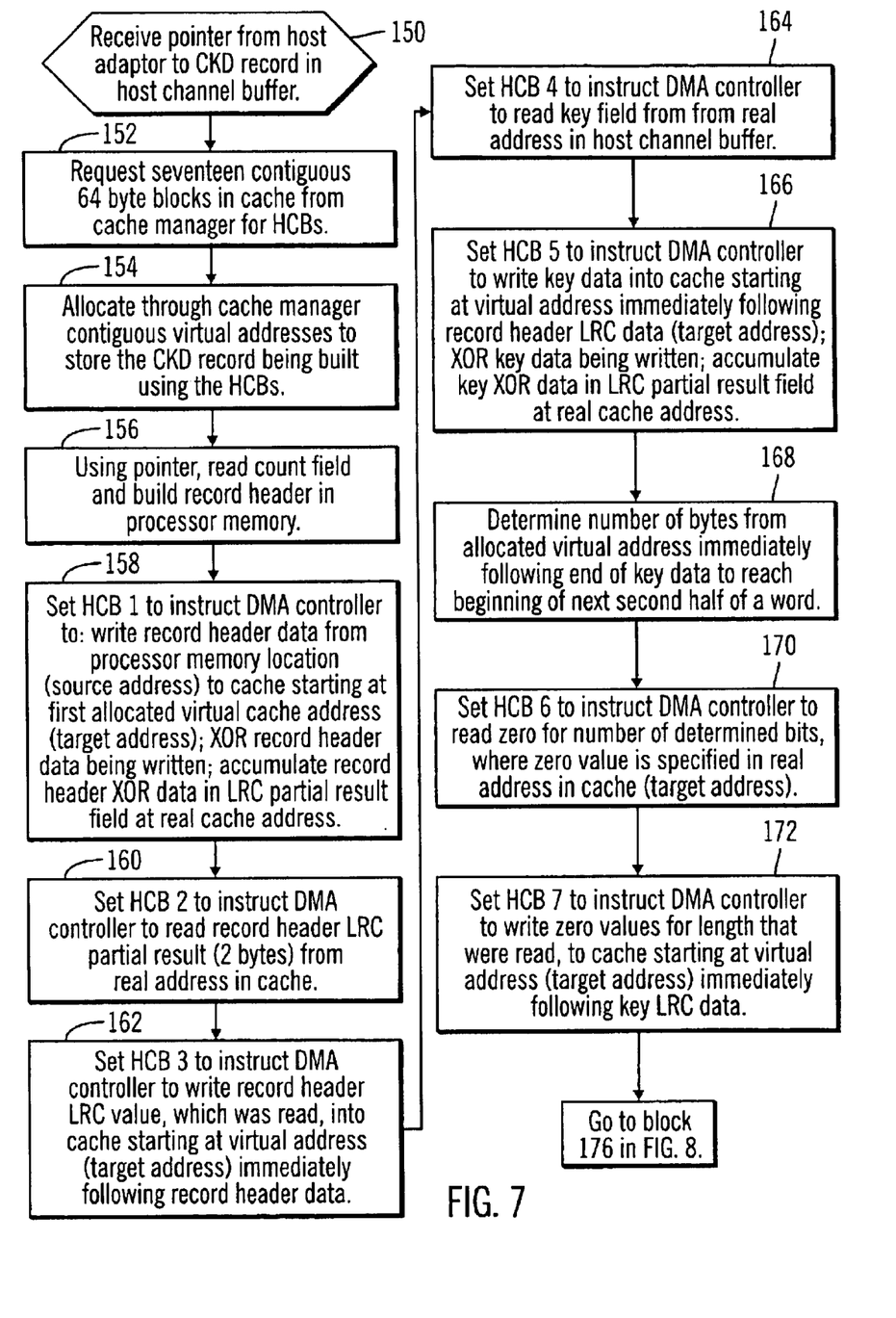
FIGS. 7 and 8 illustrate logic implemented in a processor to build the hardware control blocks (HCBs) in memory in memory in accordance with preferred embodiments of the present invention.

FIG. 7 illustrates logic implemented in the firmware or code of the processor 10 to encode each of the hardware control block (HCB) fields based on the CKD record 50 in the host channel buffer 18. Control begins at block 150 with the processor 10 receiving a pointer 58 (FIG. 3) from the host adaptor 32 to a CKD record 50 in the host channel buffer 18. In response, the processor 10 requests (at block 152) seventeen contiguous 64 byte blocks in cache 20 from the cache manager for the seventeen hardware control blocks (HCBs) that will be built. At block 154, the processor 10 allocates sufficient cache 20 memory to hold the CKD record. Cache memory 20 is typically allocated in fixed sized cache pages. Each page contains a fixed number of 512 byte blocks. The cache pages used to store the CKD record are accessed using a virtual address space so that non-contiguous cache pages can be accessed as one contiguous address space. Thus, the DMA controller 30 will superimpose the CKD records on the virtual address space in cache 20. In the described implementations, the processor 10 accesses the fixed blocks in cache 20 for the HCBs using real addressing. The processor 10 uses (at block 156) the pointer 58 to access the CKD record 50 and read the count field 52. The processor 10 builds the record header 100 from the count field 52 data in the processor memory 16. From blocks 158 to 200, the processor 10 sets all the values in the seventeen hardware control blocks (HCBs) to instruct the DMA controller 30 to transfer the CKD records to fixed block sectors in cache 20.

At block 158, the processor 10 sets the fields for HCB 1 as shown in FIG. 5 to instruct the DMA controller 30 to write (as indicated in the direction field 62) the record header data from the processor memory 16 location (as indicated in the source address 78) into cache 20 starting at the first allocated virtual address (indicated as the target address 76) provided by the cache manager for the length of the record header 100 (length field 74), such as the 30 byte record header used in certain implementations discussed herein. Further, HCB 1 is set to instruct the DMA controller 30 to generate LRC data for the record header data (as indicated in the generate LRC field 68) while writing the record header data to cache 20. The LRC data is accumulated in the LRC partial result field 80. At block 160, the processor 10 sets the fields for HCB 2 as shown in FIG. 5 to instruct the DMA controller 30 to read (as indicated in the direction field 62) the record header LRC value from the LRC partial result field 80 (as indicated in the target address 76), which is a real address in cache 20 (as indicated by the memory location 60 and sector mode 66 fields). At block 162, the processor sets the fields for HCB 3 as shown in FIG. 5 to instruct the DMA controller 30 to write (as indicated in the direction field 62) the record header LRC value 102 (FIG. 6) just read, into a cache virtual address (as indicated by the memory location 60 and sector mode 66 fields) location (the target address 76), which is the immediate virtual address following the record header data 100 (FIG. 6) (or following the length of the record header data 100 in the length field 74 of HCB 1).

At block 164, the processor 10 sets the fields for HCB 4 as shown in FIG. 5 to instruct the DMA controller 30 to read (as indicated in the direction field 62) the entire key data (indicated in the length field 74) from a real address (as indicated in the sector mode 66) in a host channel buffer 18 location (the target address 76). At block 166, the processor 10 sets the fields for HCB 5 as shown in FIG. 5 to instruct the DMA controller 30 to write (as indicated in the direction field 62) the key data 54 (FIG. 3) read, according to HCB 4, into cache 20 starting at the allocated virtual (as indicated in the sector mode 66) address (indicated as the target address 76), shown 104 in FIG. 6, immediately following the count LRC value 102. Further, HCB 5 is set to instruct the DMA controller 30 to generate LRC data for key count data (as indicated in the generate LRC field 68) while writing the key data to cache 20 blocks.

At block 168, the processor 10 determines the number of bytes from the allocated virtual address immediately following the end of the key data to the beginning of the next second half of a word. A word comprises one of contiguous four byte pieces of a 512 byte sector. The second half of a word comprises the last two bytes. Thus, at block 168, the processor 10 determines the number of bytes from the end of the key data 104 (FIG. 6) to the next last two bytes of a word, which may be in the current word if the key data ends in the first half of a word or in the next word if the key data ends in the second half of the current word. At block 170, the processor sets HCB 6 as shown in FIG. 5 to instruct the DMA controller 30 to read a zero value (which is maintained at a real address indicated as the target address 76) for the number of determined bytes (specified in the length field 74). These read zeros are used to pad the block 106 from the end of the key data 104 to the beginning of the next second half of a word. At block 172, the processor 10 sets the fields for HCB 7 as shown in FIG. 5 to instruct the DMA controller 30 to write (as indicated in the direction field 62) the pad of zeroes 106 (FIG. 6) into a cache virtual address (as indicated by the memory location 60 and sector mode 66 fields) location (the target address 76), which is the immediate virtual address following the key data 106 (FIG. 6).

Figure 8:
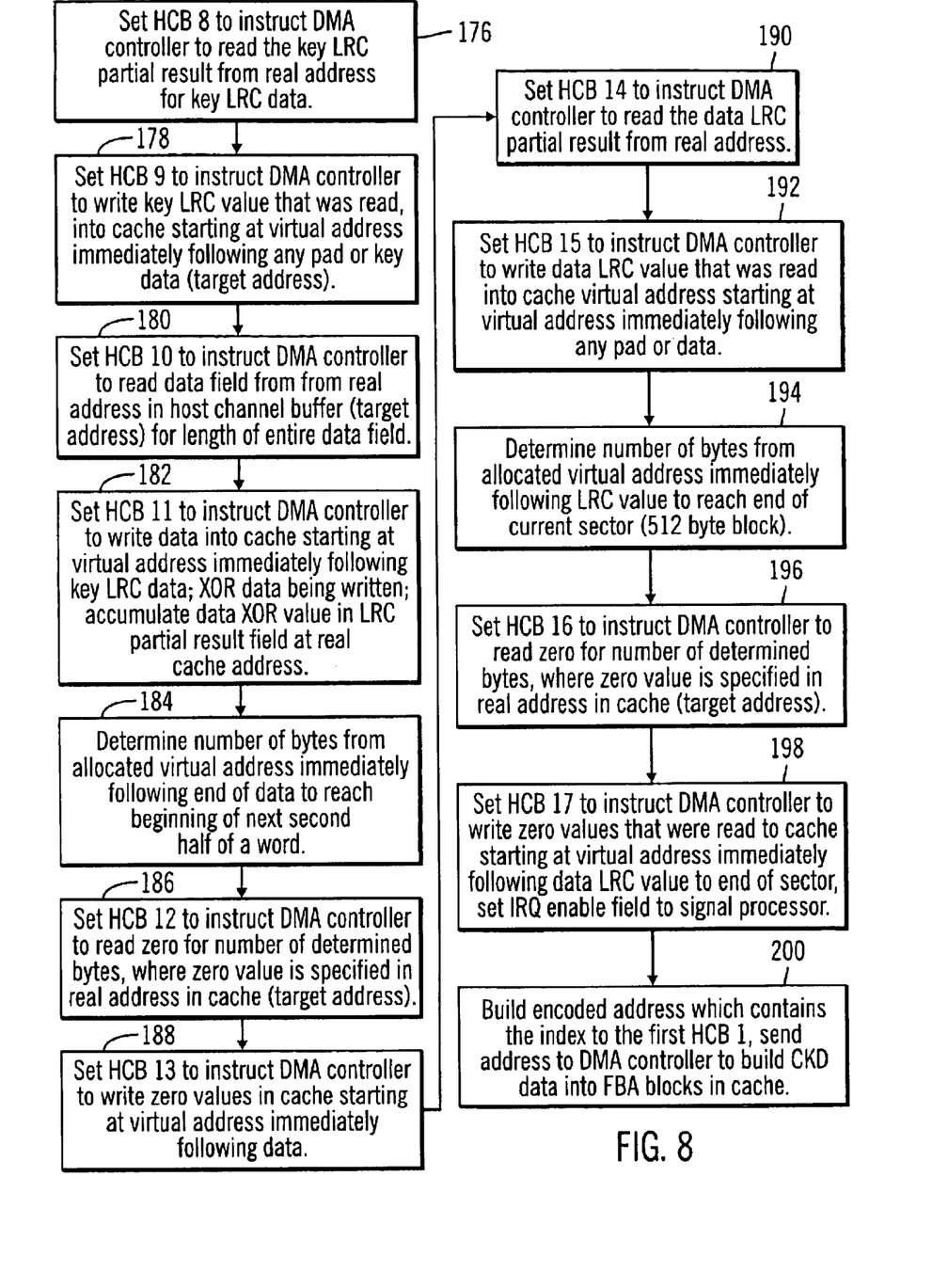

With respect to FIG. 8, at block 176, the processor 10 sets the fields for HCB 8 as shown in FIG. 5 to instruct the DMA controller 30 to read the key LRC value from the LRC partial result field 80 of HCB 5 (as indicated in the target address 76), which is a real address in cache 20 (as indicated by the memory location 60 and sector mode 66 fields). At block 178, the processor 10 sets the fields for HCB 9 as shown in FIG. 5 to instruct the DMA controller 30 to write (as indicated in the direction field 62) the just read key LRC value into a cache virtual address (as indicated by the memory location 60 and sector mode 66 fields) location (the target address 76), which is the immediate virtual address shown as location 108 following the pad 106.

At block 180, the processor 10 sets the fields for HCB 10 as shown in FIG. 5 to instruct the DMA controller 30 to read (as indicated in the direction field 62) the entire data 56 (FIG. 3) (indicated in the length field 74) from a real address (as indicated in the sector mode 66) in a host channel buffer 18 location (the target address 76). At block 182, the processor 10 sets the fields for HCB 11 as shown in FIG. 5 to instruct the DMA controller 30 to write (as indicated in the direction field 62) the data 56 (FIG. 3) read according to HCB 10 into cache 20 starting at the allocated virtual (as indicated in the sector mode 66) address (indicated as the target address 76) immediately following the key LRC value 108 at location 110a. Further, HCB 11 is set to instruct the DMA controller 30 to generate LRC data for the data 56 (as indicated in the generate LRC field 68) while writing the data to cache 20 blocks as shown as 110a, b, c in FIG. 6.

At block 184, the processor 10 determines the number of bytes from the allocated virtual address immediately following the end of the data 110c (FIG. 6) to the beginning of the next second half of a word in sector 122. At block 186, the processor 10 sets HCB 12 as shown in FIG. 5 to instruct the DMA controller 30 to read a zero value (which is maintained at a real address indicated as the target address 76) for the number of determined bytes at block 184 (specified in the length field 74). The zeros read are used to pad the block 112 (FIG. 6) from the end of the data 110c to the beginning of the next second half of a word in sector 122. At block 188, the processor 10 sets the fields for HCB 13 as shown in FIG. 5 to instruct the DMA controller 30 to write (as indicated in the direction field 62) the pad 112 of zeroes (FIG. 6) into a cache virtual address (as indicated by the memory location 60 and sector mode 66 fields) location (the target address 76), which is the immediate virtual address location 112 following the data 110c.

At block 190, the processor 10 sets the fields for HCB 14 as shown in FIG. 5 to instruct the DMA controller 30 to read the data LRC value from the LRC partial result field 80 (as indicated in the target address 76) set by HCB 11, which is a real address in cache 20 (as indicated by the memory location 60 and sector mode 66 fields). At block 192, the processor 10 sets the fields for HCB 15 as shown in FIG. 5 to instruct the DMA controller 30 to write (as indicated in the direction field 62) the data LRC value just read into a cache virtual address (as indicated by the memory location 60 and sector mode 66 fields) starting at the location (the target address 76) that is the immediate virtual address 114 (FIG. 6) following the pad 112 (or following the length of the pad indicated in the length field 74 of HCBs 12 and 13).

At block 194, the processor 10 determines the number of bytes from the allocated virtual address immediately following the end of the data LRC 114 (FIG. 6) to the end of the current sector 122. At block 196, the processor 10 sets HCB 16 as shown in FIG. 5 to instruct the DMA controller 30 to read a zero value (which is maintained at a real address indicated as the target address 76) for the number of determined bytes at block 194 (specified in the length field 74). These read zeros are used to pad the sector 122 from the data LRC 114 to the end of the current sector 122. At block 198, the processor 10 sets the fields for HCB 17 as shown in FIG. 5 to instruct the DMA controller 30 to write (as indicated in the direction field 62) the pad of zeroes (FIG. 6) into a cache virtual address (as indicated by the memory location 60 and sector mode 66 fields) location (the target address 76), which is the virtual address shown at block 116 in FIG. 6 immediately following the data LRC 114. The processor 10 would further set the IRQ enable field 70 at HCB 17 to instruct the DMA controller 30 to signal an interrupt to indicate to the processor 10 that the CKD data in the host channel buffer 18 has been completely mapped to sectors in the cache 20, including LRC data and pads, as shown by way of example in FIG. 6. FIG. 6 illustrates an example of how a CKD data record maps to FBA sector blocks in cache 20. However, different sized CKD records having different length count, key and data fields would map to the cache 20 FBA sectors differently than shown in FIG. 6.

Figure 9:
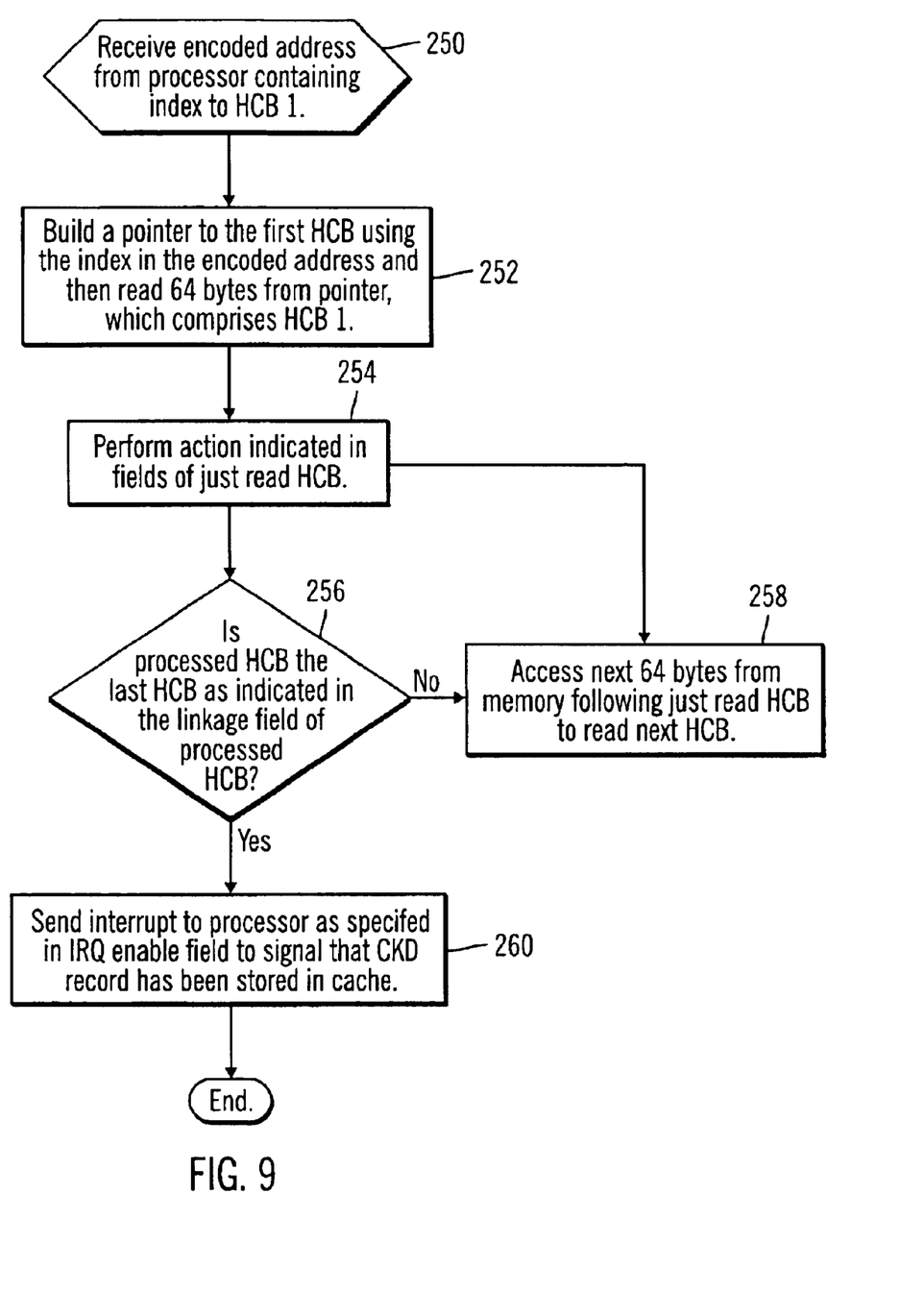
FIG. 9 illustrates logic implemented in a Direct Memory Access (DMA) controller to superimpose a CKD record onto an FBA format in memory according to the instructions provided in the hardware control blocks (HCBs) in memory in accordance with preferred embodiments of the present invention.

After building all the hardware control blocks (HCBs) into cache 20, the processor 10 returns (at block 200) a pointer to the first hardware control block (HCB 1) in the cache 20 to the DMA controller 30. FIG. 9 illustrates logic executed by the DMA controller 30 to process the hardware control blocks generated into cache 20. Control begins at block 250 with the DMA controller 30 receiving an encoded address that contains an index to the first hardware control block (HCB 1) in cache 20. In response, the DMA controller 30 builds (at block 252) a pointer to the first HCB using the index in the encoded address and then reads the 64 bytes from the pointer, which comprises HCB 1. The DMA controller 30 performs (at block 254) the actions specified in the fields of the read HCB 1. In certain implementations, the DMA controller may read the entire 64 bytes from cache before performing the action specified in the hardware control block (HCB). Alternatively, the DMA controller 30 may read fields from the HCB and then perform the specified operation before reading and executing further instructions from the HCB. In addition, the DMA controller 30 may choose to prefetch more than one 64 byte HCB if the linkage field indicates linked HCBs. After performing all actions specified in the hardware control block (HCB), if (at block 256) the just executed hardware control block (HCB) is not the last HCB as indicated in the linkage field 64, then the DMA controller 30 accesses (at block 258) the next 64 bytes of memory following the previously executed HCB, i.e., the next HCB. In certain implementations, the HCBs are accessed using real addressing. Control then returns to block 254 to perform the actions indicated in the fields of the next accessed hardware control block (HCB). If (at block 256) the processed HCB is the last, then the DMA controller 30 sends (at block 260) an interrupt signal to the processor 10 indicating that the CKD record has been superimposed onto the FBA cache 20, as instructed by the value in the IRQ enable field 70.

While the DMA controller 30 is processing control blocks, the processor 10 may build additional sets of hardware control blocks in cache 20 for additional CKD records in the host channel buffer 18. The processor 10 would provide the DMA controller 30 with an encoded address containing an index to the first hardware control block (HCB) in the additional set to continue transforming CKD records into the cache 20 FBA fixed blocks.

Described embodiments provide a technique for instructing a DMA controller 30 to superimpose CKD records onto FBA formatted storage blocks. In this way, all the CKD to FBA conversion operations are handled by the DMA controller 30 and not the processor. The processor 10 only has to set-up the hardware control blocks (HCB). In this way, processor 10 performance is substantially improved because the processor is not burdened with the substantial processing task of superimposing a CKD record onto a FBA blocks, including generating the LRC codes and pads to "fit" the CKD record into the FBA.

The following describes some additional implementations.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The preferred logic of FIGS. 7–9 describe specific operations occurring in a particular order. In alternative embodiments, certain of the logic operations may be performed in a different order, modified or removed and still implement preferred embodiments of the present invention. Morever, steps may be added to the above described logic and still conform to the preferred embodiments. Further, operations described herein may occur sequentially or certain operations may be processed in parallel.

In preferred embodiments, data was transferred in sectors. In alternative embodiments, blocks of data may be transferred in storage units other than sectors.

In the described embodiments, the hardware control block had particular fields at particular bit and byte locations. In alternative embodiments, different fields may be included in the hardware control blocks and the processor 10 may build a different number of hardware control blocks than those described herein to accomplish the conversion of CKD records to a FBA format.

As discussed, in certain implementations, the storage device 6 may comprise a RAID device. In RAID implementations, the storage controller 8 can perform CKD mapping on fixed blocks in cache using only a RAID engine. With the described implementations, no specialized CKD hardware is need as the DMA controller 30 maps the CKD records to the fixed blocks in cache 20. The RAID engine would then just destage the CKD records superimposed into the fixed blocks in cache 20 to the RAID storage device 8 in a manner known in the art.

In the described implementations, a data record in a CKD format is superimposed onto a FBA formatted block(s). In additional implementations, the hardware control blocks may define the operations needed to superimpose a data record in a format other than CKD, e.g., SCSI, etc., onto storage sectors in a format other than FBA.

In described implementations, a DMA controller accesses the hardware control blocks generated by the processor to perform the operations to superimpose the CKD records into FBA blocks in cache memory. In alternative embodiments, data transfer devices other than a DMA controller may use the blocks to perform the operations to superimpose the CKD record into FBA blocks. Such data transfer devices may comprises a dedicated hardware integrated circuit, such as a FPGA, ASIC, etc., or a processor operating under program control.

In described implementations, the processor allocated and set the value in the hardware control blocks. In alternative implementations, a device other than the processor may build the hardware control blocks (HCBs) for the DMA controller to use.

In the described implementations, a single memory device 12 was used to implement the host channel buffer 18 and cache 20. Additionally, multiple memory devices may be used to implement buffer 18 and cache 20. Further, the buffer 18 and cache 20 may be implemented on the same memory device(s) or separate memory device(s).

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for superimposing a data record in a first data format in a second data format, comprising:
   building a plurality of control blocks in a memory indicating operations to perform to transfer components of the data record in the first data format to locations in the memory in the second data format;
   signaling a data transfer device to access the control blocks built in the memory;
   accessing, with the data transfer device, the control blocks in the memory;
   transferring, with the data transfer device, components of the data record in the first data format to the memory to be stored in the second data format according to the operations indicated in the control blocks, wherein the data record is cached in the second data format in the memory; and
   destaging the data record in the second data format from the memory to a storage device to store in the second data format.

2. The method of claim 1, wherein signaling the data transfer device includes providing a pointer to a first control block of the plurality of control blocks, wherein the data transfer device uses the pointer to access the control blocks in the memory.

3. The method of claim 2, wherein a processor builds the control blocks in the memory and signals the data transfer device with the pointer to the first control block in the memory.

4. The method of claim 1, wherein the control blocks further instruct the data transfer device to generate an error checking code from the data record and write the error checking code into the memory to store with the data record in the second data format.

5. The method of claim 1, wherein the second data format stores data in fixed blocks in the memory, wherein the control blocks further instruct the data transfer device to transfer the data record to fixed blocks in the memory such that the data record is stored in an integral number of fixed blocks in the second data format.

6. The method of claim 1, wherein the data record in the first data format comprises multiple component parts, and wherein the control blocks further instruct the data transfer device to generate an error checking code for each component part and store the error checking codes with the component parts in the second data format.

7. The method of claim 6, wherein the control blocks further instruct the data transfer device to write one component part to the memory, followed by writing the error checking code for the component part to the memory until all the component parts are written to the memory in the second data format.

8. The method of claim 7, wherein the control blocks further instruct the data transfer device to write a pad of values between at least one of the component parts and the error checking code for the component part to ensure that the error checking code is written to a particular location in the memory in the second data format.

9. The method of claim 6, wherein the first data format comprises a count-key-data (CKD) record format, and wherein the count portion, key portion, and data portion of the CKD record each comprise one component part of the data record to write to the memory in the second data format with the error checking codes for the count portion, key portion, and data portion.

10. The method of claim 1, wherein the memory comprises a volatile memory device, further comprising:
    destaging the data record in the second data format in the volatile memory device to a storage device as part of a destage operation, wherein the storage device stores data in the second data format.

11. The method of claim 1, wherein the first data format comprises a count-key-data (CKD) data format and the second data format comprises a Fixed Block Address (FBA) format.

12. A system for superimposing a data record in a first data format onto a second data format, comprising:
    a first device;
    a second device;
    a memory accessible to the first and second devices;
    logic implemented in the first device, wherein the logic causes the first device to perform:
      (i) building a plurality of control blocks in the memory indicating operations to perform to transfer components of the data record in the first data format to locations in memory in the second data format;
      (ii) signaling a data transfer device to access the control blocks built in the memory; and
    logic implemented in the second device, wherein the logic causes the second device to perform:
      (i) accessing the control blocks in the memory;
      (ii) transferring components of the data record in the first data format to the memory to be stored in the second data format according to the operations indicated in the control blocks, wherein the data record is cached in the second data format in the memory; and
      (iii) destaging the data record in the second format from the memory to a storage device to store in the second data format.

13. The system of claim 12, wherein the logic for signaling the second device includes providing a pointer to a first control block of the plurality of control blocks, wherein the second device uses the pointer to access the control blocks in the memory.

14. The system of claim 13, wherein the first device comprises a processor.

15. The system of claim 12, wherein the control blocks further instruct the second device to generate an error checking code from the data record and write the error checking code into the memory to store with the data record in the second data format.

16. The system of claim 12, wherein the second data format stores data in fixed blocks in the memory, wherein the control blocks further instruct the second device to transfer the data record to fixed blocks in the memory such that the data record is stored in an integral number of fixed blocks in the second data format.

17. The system of claim 12, wherein the data record in the first data format comprises multiple component parts, and wherein the control blocks further instruct the data transfer device to generate an error checking code for each component part and store the error checking codes with the component parts in the second data format.

18. The system of claim 17, wherein the control blocks further instruct the second device to write one component part to the memory, followed by writing the error checking code for the component part to the memory until all the component parts are written to the memory in the second data format.

19. The system of claim 18, wherein the control blocks further instruct the second device to write a pad of values between at least one of the component parts and the error checking code for the component part to ensure that the error checking code is written to a particular location in the memory in the second data format.

20. The system of claim 17, wherein the first data format comprises a count-key-data (CKD) record format, and wherein the count portion, key portion, and data portion of the CKD record each comprise one component part of the data record to write to the memory in the second data format with the error checking codes for the count portion, key portion, and data portion.

21. An article of manufacture of for superimposing a data record in a first data format onto a second data format in memory, wherein the article of manufacture includes first device logic and second device logic to control a first and second devices, respectively, comprising:

building, with the first device logic, a plurality of control blocks in the memory indicating operations to perform to transfer components of the data record in the first data format to locations in memory in the second data format;

signaling, with the first device logic, the second device to access the control blocks built in the memory;

accessing, with the second device logic, the control blocks in the memory;

transferring, with the second device logic, components of the data record in the first data format to the memory to be stored in the second data format according to the operations indicated in the control blocks, wherein the data record is cached in the second data format in the memory; and destaging the data record in the second format from the memory to a storage device to store in the second data format.

22. The article of manufacture of claim 21, wherein signaling the second device includes providing a pointer to a first control block of the plurality of control blocks, wherein the second device logic uses the pointer to access the control blocks in the memory.

23. The article of manufacture of claim 21, wherein the first device comprises a processor.

24. The article of manufacture of claim 21, wherein the control blocks further instruct the second device logic to generate an error checking code from the data record and write the error checking code into the memory to store with the data record in the second data format.

25. The article of manufacture of claim 21, wherein the second data format stores data in fixed blocks in the memory, wherein the control blocks further instruct the data transfer device to transfer the data record to fixed blocks in the memory such that the data record is stored in an integral number of fixed blocks in the second data format.

26. The article of manufacture of claim 21, wherein the data record in the first data format comprises multiple component parts, and wherein the control blocks further instruct the data transfer device to generate an error checking code for each component part and store the error checking codes with the component parts in the second data format.

27. The article of manufacture of claim 26, wherein the control blocks further instruct the second device logic to write one component part to the memory, followed by writing the error checking code for the component part to the memory until all the component parts are written to the memory in the second data format.

28. The article of manufacture of claim 27, wherein the control blocks further instruct the second device logic to write a pad of values between at least one of the component parts and the error checking code for the component part to ensure that the error checking code is written to a particular location in the memory in the second data format.

29. The article of manufacture of claim 26, wherein the first data format comprises a count-key-data (CKD) record format, and wherein the count portion, key portion, and data portion of the CKD record each comprise one component part of the data record to write to the memory in the second data format with the error checking codes for the count portion, key portion, and data portion.

30. The article of manufacture of claim 21, wherein the memory comprises a volatile memory device, further comprising:

destaging, with the second device logic, the data record in the second data format in the volatile memory device to a storage device as part of a destage operation, wherein the storage device stores data in the second data format.

31. The article of manufacture of claim 21, wherein the first data format comprises a count-key-data (CKD) data format and the second data format comprises a Fixed Block Address (FBA) format.

* * * * *